United States Patent
Rausch et al.

(10) Patent No.: US 7,277,727 B1
(45) Date of Patent: Oct. 2, 2007

(54) SYSTEM AND METHOD FOR PROCESSING A SIGNAL

(75) Inventors: Walter F. Rausch, Shawnee, KS (US); Anthony A. Panella, Littleton, CO (US); Michael P. Denny, Chandler, AZ (US); Harry W. Perlow, Tarpon Springs, FL (US); Bryan H. Scott, Castle Rock, CO (US)

(73) Assignee: Sprint Communications Company L.P., Overland Park, KS (US)

( * ) Notice: Subject to any disclaimer, the term of this patent is extended or adjusted under 35 U.S.C. 154(b) by 778 days.

(21) Appl. No.: 09/718,312

(22) Filed: Nov. 22, 2000

(51) Int. Cl.
  *H04B 1/38* (2006.01)
  *H04B 7/14* (2006.01)
  *H04B 1/40* (2006.01)

(52) U.S. Cl. .................. 455/561; 455/560; 455/75; 455/8; 455/22; 455/119

(58) Field of Classification Search ............ 455/3.01, 455/14, 22, 502, 119, 118, 561, 560; 359/109, 359/152
  See application file for complete search history.

(56) References Cited

U.S. PATENT DOCUMENTS

| | | | |
|---|---|---|---|
| 4,809,005 A | | 2/1989 | Counselman, III |
| 5,046,066 A | | 9/1991 | Messenger |
| 5,331,453 A | | 7/1994 | Lipsky |
| 5,400,391 A | | 3/1995 | Emura et al. |
| 5,689,431 A | * | 11/1997 | Rudow et al. .............. 701/213 |
| 5,708,971 A | | 1/1998 | Dent |
| 5,809,397 A | * | 9/1998 | Harthcock et al. ......... 455/13.2 |
| 5,870,001 A | * | 2/1999 | Osterling et al. ............ 331/11 |
| 5,930,682 A | * | 7/1999 | Schwartz et al. ............ 455/14 |
| 5,936,754 A | * | 8/1999 | Ariyavisitakul et al. .... 359/145 |
| 5,970,400 A | * | 10/1999 | Dwyer ....................... 455/254 |
| 5,982,322 A | * | 11/1999 | Bickley et al. ............ 342/357 |
| 5,983,070 A | | 11/1999 | Georges et al. |
| 6,014,546 A | * | 1/2000 | Georges et al. .............. 725/79 |
| 6,047,192 A | * | 4/2000 | Maloney et al. ............ 455/456 |

(Continued)

FOREIGN PATENT DOCUMENTS

DE 3707244 * 9/1988

(Continued)

OTHER PUBLICATIONS

J. A. Kusters et al, "A No-drift and less than 10(−13) Long term Stability Quartz Oscillator using a GPS SA filter", Proc. of IEEE Internation Frequency Control Symposium, pp. 572-577, 1994.*

Primary Examiner—Duc M. Nguyen

(57) ABSTRACT

A system and method for receiving a communication signal includes a timing source that generates a stable timing signal and a stabilized local oscillator that receives the stable timing signal and uses the stable timing signal as an input to generate a stabilized oscillator signal. An antenna receives the communication signal at a receiving frequency, and the communication signal is filtered and amplified. A low noise block converter uses the stabilized oscillator signal to convert the receiving frequency of the communication signal to a stable lower frequency. A fiber optic transmitter converts the communication signal to an optical signal and transmits the optical signal over fiber optic cable. A fiber optic receiver receives the optical signal over the fiber optic cable. The optical signal then can be converted to an electrical signal.

17 Claims, 3 Drawing Sheets

U.S. PATENT DOCUMENTS

| | | | |
|---|---|---|---|
| 6,161,024 A * | 12/2000 | Komara | 455/562.1 |
| 6,163,294 A * | 12/2000 | Talbot | 342/357.06 |
| 6,185,429 B1 * | 2/2001 | Gehrke et al. | 455/502 |
| 6,188,873 B1 * | 2/2001 | Wickman et al. | 455/11.1 |
| 6,194,970 B1 * | 2/2001 | Nielsen et al. | 331/16 |
| 6,198,558 B1 * | 3/2001 | Graves et al. | 359/137 |
| 6,243,577 B1 * | 6/2001 | Elrefaie et al. | 455/426.2 |
| 6,266,013 B1 * | 7/2001 | Stilp et al. | 342/387 |
| 6,308,077 B1 * | 10/2001 | Walsh | 455/503 |
| 6,411,825 B1 * | 6/2002 | Csapo et al. | 455/561 |
| 6,597,325 B2 * | 7/2003 | Judd et al. | 343/853 |
| 6,865,169 B1 * | 3/2005 | Quayle et al. | 370/335 |
| 2002/0039885 A1 * | 4/2002 | Weissman et al. | 455/20 |

FOREIGN PATENT DOCUMENTS

| | | |
|---|---|---|
| EP | 1049195 | 11/2000 |
| GB | 2347319 | 8/2000 |
| JP | 9321688 | 12/1997 |

* cited by examiner

SYSTEM AND METHOD FOR PROCESSING A SIGNAL

RELATED APPLICATIONS

Not Applicable

FEDERALLY SPONSORED RESEARCH OR DEVELOPMENT

Not Applicable

MICROFICHE APPENDIX

Not Applicable

FIELD OF THE INVENTION

The present invention relates to the field of receiving wireless communications.

BACKGROUND OF THE INVENTION

A variety of technologies are used to transmit and receive wireless communications. Among these wireless technologies are satellite services, wireless communications service (WCS), personal communications service (PCS), cellular, and multipoint multichannel distribution service (MMDS). Many of these wireless technologies have equipment on towers to transmit and receive communications. For example, antennas are located on the towers to transmit and receive communications, and other equipment is located at the base of the towers to process communications for transmitting or to process communications that have been received.

With the MMDS technology, for example, large transmission lines are used to carry the communications between the antennas and the base of the towers. These transmission lines typically are thick, heavy, and allow much of the communication signal to be lost due to noise and resistive loss. Also, they have a significant impact on tower loading. In addition, the transmission lines are subject to radio frequency (RF) interference from nearby RF sources. Therefore, an improved system is needed to carry communications between the antenna and the base of towers to reduce tower load and to decrease unwanted RF ingress.

SUMMARY OF THE INVENTION

The present invention is directed to a system for receiving a communication signal having a frequency. The system comprises a timing source configured to generate a stable timing signal and a stabilized local oscillator configured to receive the stable timing signal and to use the stable timing signal as an input to generate a stabilized oscillator signal. The system also comprises an antenna configured to receive the communication signal at the frequency and a block converter configured to use the stabilized oscillator signal to convert the frequency of the signal to a stable lower frequency. The system further includes a fiber optic transmitter configured to convert the lower frequency signal to an optical signal and to transmit the optical signal over fiber optic cable. A fiber optic receiver is configured to receive the optical signal over the fiber optic cable.

The present invention also is directed to a method for receiving a communication signal having a receiving frequency. The method comprises generating a stable timing signal and using the stable timing signal as an input to a local oscillator to generate a stabilized oscillator signal. The communication signal is received. The receiving frequency of the communication signal is converted to a stable lower frequency using the stabilized oscillator signal. The lower frequency signal is converted to an optical signal, and the optical signal is transmitted over fiber optic cable. The optical signal is received over the fiber optic cable.

The present invention is directed to other systems and methods that include fewer or greater limitations as described more completely below. In addition, the present invention is directed to systems and methods that include other limitations as described more completely below.

DETAILED DESCRIPTION

Figure 1:
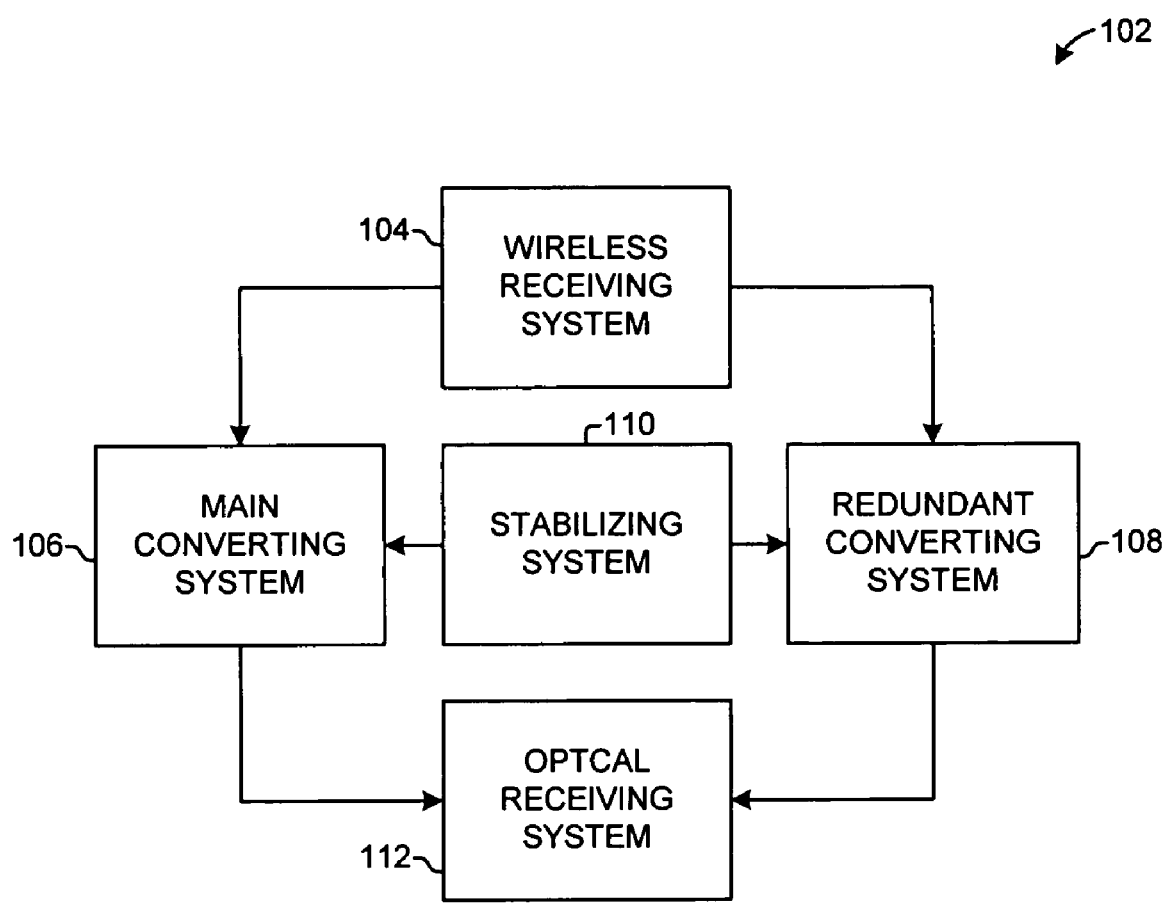
FIG. 1 is a block diagram of a wireless communication system in accordance with an embodiment of the present invention.

Many wireless communication technologies use towers to receive and transmit communications. These towers typically have a receiving and/or transmitting antenna and additional components to process received communication signals or to process or generate communication signals to be transmitted.

These towers typically use thick transmission lines to carry communication signals between the antenna and the base of the tower. Thick RF transmission lines are used because high frequency communication signals are transmitted between the antenna and the base of the towers, and many of these high frequency communication signals are transmitted.

Because the transmission lines typically are thick, they place a heavy load on the tower. The heavy load of the thick transmission line limits the number of transmission lines that can be placed on the tower, thereby limiting the number of communication signals that can be carried between the antenna and the base of the towers.

Also, electrical interference and interference from radio frequency (RF) emissions can reduce the quality of the communications being transmitted on a transmission line. Noise and other interference ingressing into the transmission line distorts the communication signals being transmitted on the transmission line.

These wireless technologies also sometimes use block converters at the base of towers to lower communication signals in frequency. These block converters have a local oscillator whose input frequency tends to move around. Thus, the output of the block converter is not stable and subject to drift.

The wireless communication system of the present invention uses optical transmissions on fiber optic cable to carry communication signals between the antenna and the base of the tower. This significantly lightens the load on the tower. As a result, bandwidth capacity is increased while tower loading is reduced.

As used herein, the terms "signal" or "communication signal" mean a communication that may be received and/or transmitted. A signal may be a wireless signal or a wireline signal. A signal may have user communications, such as voice, data, or video, and/or call signaling or control messages, such as device instructions.

As used herein, the term "fiber optic cable" means one or more optical fibers over which signals can be transmitted optically. Fiber optic cable may or may not include multiple fibers, strength members, metallic conductors, and/or other protective cladding or outer jackets. In addition, there are other methods to manufacture fiber optic cable, and it may include other internal support structures.

The fiber optic cables can carry a significantly greater number of communication signals than other RF transmission lines such as coax cable, thereby increasing the capacity of the number of communication signals that can be handled by any one tower. Thus, more antennas may be placed on a tower, and more communication signals can be received at the antennas and transmitted to the base of the tower because each fiber optic cable has greater capacity and because a greater number of cables can be placed on the tower to carry communication signals.

Because fiber optic cable is used in the wireless communication system, a cost savings may be realized with equipment and maintenance costs. The fiber optic cable use results in a reduction in tower load and an increase in bandwidth capacity.

The mid and upper portions of the towers typically have electrical interference created by electrical storms, RF interference created by other communication signals, or other electrical, electromagnetic, and/or RF interference (herein, electrical interference). This interference can penetrate the components at the mid or upper portion or the base of the communication system, and interference or noise can ingress into the communication system.

However, electrical interference does not affect fiber optic cable or communication signals being transmitted on the fiber optic cable. Therefore, because fiber optic cable is used to transmit the communication signals between the antenna and the base of the tower, the components at the mid or upper portion of the tower are electrically isolated from the components at the base of the tower. Thus, electrical interference at the mid and upper portions of the tower will have little, if any, effect on components at the base of the tower or the communication signals being transmitted. This results in improvement in the quality of the communication signals being received at the base of the towers.

In addition, the wireless communication systems of the present invention use a stable timing signal, such as a global positioning system (GPS) timing signal or another stable timing signal, to stabilize a local oscillator in a low noise block converter (LNB). The stable timing signal enables the LNB to output a more stable communication signal that has less drift and, therefore, has increased quality.

In some embodiments, the wireless communication system uses alternating current (AC) power to power system components. The AC power helps reduce electrolysis of components.

The wireless communication system preferably can be used with multipoint multichannel distribution service (MMDS). MMDS is a wireless technology that uses fixed stations to transmit communication signals to, and receive communication signals from, multiple fixed facilities, typically between approximately a 1.7-2.7 gigahertz (GHz) frequency. Other frequencies may be used. The stations and facilities currently are within line-of-sight of each other. Future applications may or may not require line-of-sight. MMDS provides a platform for advanced services and features, such as broadband data, voice, video, and high-speed internet access.

The wireless communication system also can be used with other wireless technologies, such as satellite service, personal communication service (PCS), wireless communications service (WCS), and cellular service. One skilled in the art will understand that the wireless communication system may be modified for other wireless technologies.

FIG. 1 illustrates an exemplary embodiment of a wireless communication system of the present invention. The wireless communication system 102 receives communication signals at a tower, converts the communication signals to optical signals, and transmits the optical signals to a receiving location. In this example, the wireless communication system 102 converts the optical signals to electrical signals at or near the base. However, in other examples, the optical signals may be converted at a hub, within a range of the base of a tower, or at another location. Alternately, the optical signals may not be converted to electrical signals at all. The wireless communication system 102 of FIG. 1 has a wireless receiving system (WRS) 104, a main converting system (MCS) 106, a redundant converting system (RCS) 108, a stabilizing system 110, and an optical receiving system (ORS) 112.

The WRS 104 receives wireless communication signals. Preferably, the WRS 104 filters the communication signals to block emissions and other communication signals that are not within a desired frequency.

The MCS 106 amplifies the amplitude of the communication signal. The MCS 106 converts the communication signal to a stable intermediate frequency (IF) signal. The MCS 106 has a local oscillator that produces a stable oscillator signal used to convert the communication signal to the stable IF signal. In addition, the MCS 106 converts the IF signal to an optical signal and transmits the optical signal over fiber optic cable. The MCS 106 is used as the primary converting system.

The RCS 108 amplifies the amplitude of the communication signal and converts the communication signal to a stable IF signal. The RCS 108 has a local oscillator that produces a stable oscillator signal used to convert the communication signal to the stable IF signal. In addition, the RCS 108 converts the IF signal to an optical signal and transmits the optical signal over fiber optic cable. The RCS 108 is used as a backup converting system if the MCS 106 cannot be used for a particular signal. For example, the RCS 108 may be used if the MCS 106 is not functioning. In other embodiments, it may be used for additional capacity.

The stabilizing system 110 stabilizes the MCS 106 and the RCS 108 with a stable timing signal, such as a GPS timing signal, so that the MCS and the RCS can convert the communication signals to a lower intermediate frequency. Each of the MCS 106 and the RCS 108 have a local oscillator that is subject to drift, thereby introducing unstable drift to the communication signal. The stable timing signal is a stable signal that, when input into the local oscillator, operates to correct the drift of the local oscillator so that the local oscillator has a stable output that does not deviate from its desired frequency. The stabilizing system 110 also distributes electrical power to the MCS 106 and the RCS 108.

The ORS 112 receives the optical signal from one or both of the MCS 106 or the RCS 108. The ORS 112 may convert the optical signal to an electrical signal. The ORS 112 transmits the electrical signal or optical signal to the next component of the wireless communication system 102.

The wireless communication system 102 of FIG. 1 operates as follows. In a first example, the WRS 104 receives a communication signal. In addition to the received communication signal, other emissions are received at the WRS 104. However, the WRS 104 filters the emissions from the signal and passes the communication signal to the MCS 106.

The MCS 106 amplifies the communication signal. The MCS 106 uses a stable timing signal, an amplified communication signal, and a stable (local) oscillator signal as inputs to convert the signal to a lower frequency IF signal. In this example, the stable timing signal is generated from the stabilizing system 110 and is used as an input to a local oscillator in the MCS 106 to generate a stable oscillator signal from the local oscillator. The stable oscillator signal is used along with the amplified communication signal as inputs to a converter that outputs the lower frequency IF signal.

The MCS 106 converts the lower frequency IF signal to an optical signal. The MCS 106 then transmits the optical signal over fiber optic cable to the ORS 112.

The ORS receives the optical signal and converts the optical signal to an electrical signal. The ORS 112 can be configured to transmit the electrical signal to another component or system.

In another example, the WRS 104 receives a communication signal. In this example, the MCS 106 cannot handle the communication signal. Therefore, the WRS 104 transmits the communication signal to the RCS 108.

The RCS 108 receives the communication signal and converts the communication signal to an optical signal. The RCS 108 then transmits the optical signal over fiber optic cable to the ORS 112.

The ORS 112 determines that an optical signal is being received from the RCS 108 and receives the optical signal. The ORS 112 converts the optical signal to an electrical signal. The ORS 112 then can transmit the electrical signal to another component of the wireless communication system 102 or to another system. In other examples, the RMCS 106 and the RCS 108 do not convert the optical signal to an electrical signal before transmitting it.

Figure 2:
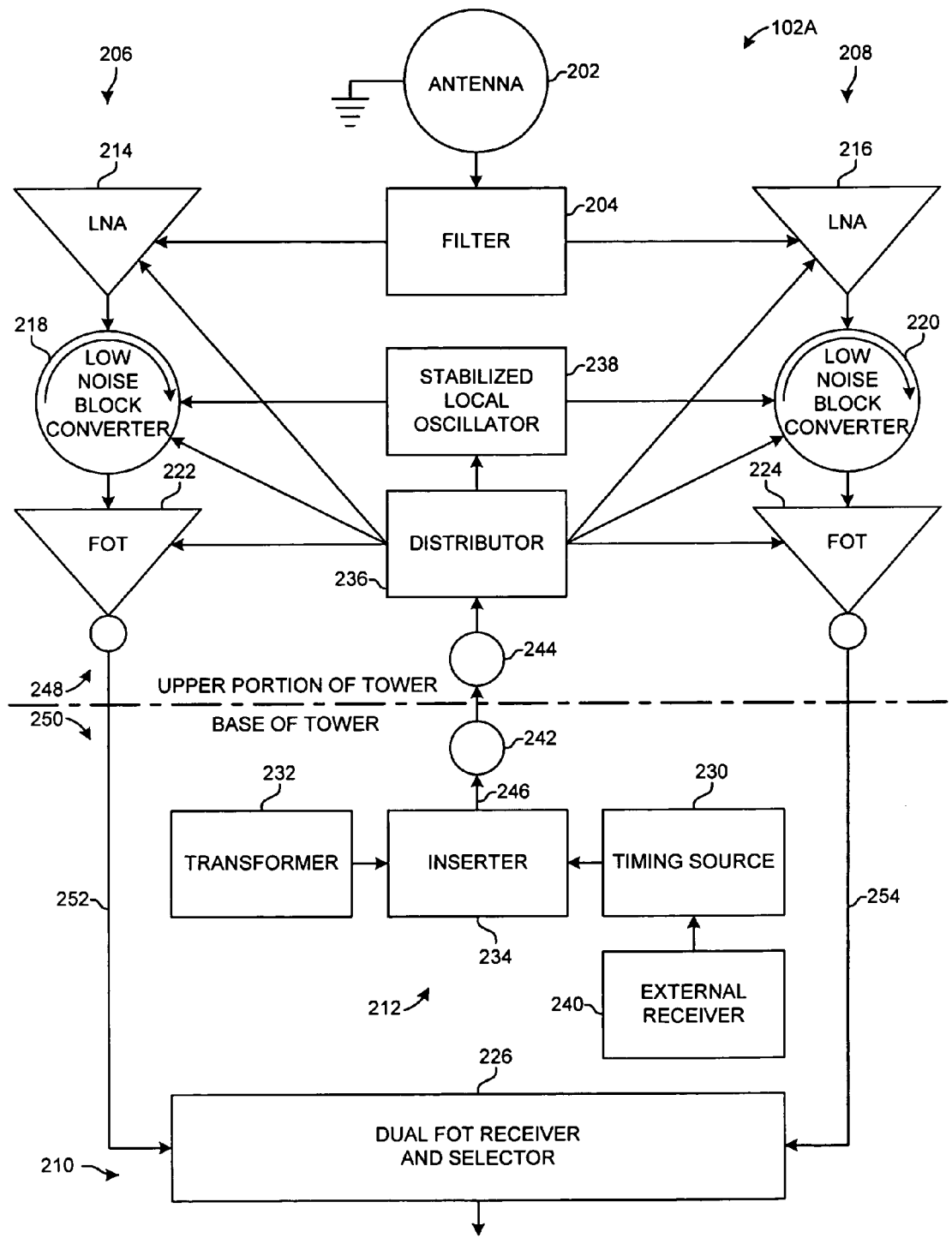
FIG. 2 is a block diagram of an expanded wireless communication system in accordance with an embodiment of the present invention.

FIG. 2 illustrates an exemplary embodiment of an expanded wireless communication system of the present invention. The wireless communication system 102A of FIG. 2 comprises an antenna 202, a filter 204, a main signal converting system 206, a redundant signal converting system 208, an optical receiving system 210, and a stabilizing system 212.

The antenna 202 comprises any receiver configured to receive communication signals. Typically, the antenna 202 receives communication signals at a high frequency. The antenna 202 can be lightening protected. Preferably, the communication signals are received, for example, at approximately between 1.7-2.7 GHz. Other frequencies ranging above and below can be received.

The filter 204 limits the bandwidth of the receivable communication signals. The filter 204 blocks emissions and other communication signals that are close in frequency to the desired receiving frequency, but are not the desired frequency. For example, when the wireless communication system 102A is used to receive MMDS communication signals, the blocked emissions include PCS communication signals, WCS communication signals, and radar emissions. Preferably, the filter 204 comprises a band pass filter.

The main signal converting system 206 and the redundant signal converting system 208 each can receive the communication signals from the filter 206 and convert the communication signals to optical signals. The main signal converting system 206 is the primary default signal converting system, and the redundant signal converting system 208 is the backup signal converting system used when the main signal converting system cannot be used for a particular signal. The main signal converting system 206 and the redundant signal converting system 208 each comprises a low noise amplifier (LNA) 214 or 216, a low noise block converter (LNB) 218 or 220, and a fiber optic transmitter (FOT) 222 or 224.

The LNAs 214 and 216 amplify the communication signal received from the filter 204. The LNAs 214 and 216 amplify the communication signal because signal loss occurs as the signal is transmitted over communication lines and/or through components of the wireless communication system 102A, such as the LNBs 218 and 220, so that there is zero gain. The LNAs 214 and 216 must amplify the communication signal to a threshold level so that the LNBs 218 and 220 are able to recognize and convert the communication signal. This threshold level sometimes is a level above the noise threshold of the receiving antenna.

The LNAs 214 and 216 are used to amplify the signal near the antenna because, when done near the antenna, proportionately more of the communication within the communication signal is amplified over noise. If, for example, the communication signal was amplified at the base of the tower, proportionately more noise would be amplified than near the antenna. In addition, the performance of the FOT receiver is improved when the communication signal is amplified in the LNA 214 or 216 and prior to its conversion from a high frequency signal to a lower intermediate frequency signal.

The LNBs 218 and 220 convert the communication signal from a high frequency signal to a lower IF signal. The IF signal has less loss than a high frequency signal when it is transmitted over a distance through cable, components, or another communication medium. The LNBs 218 and 220 are placed after the LNAs 214 and 216 so that the communication signals can be converted to a lower frequency before they are transmitted. This lowers loss that may be experienced during transmission over non-fiber optic components to the base of the tower.

The LNBs 218 and 220 operate as mixers and down converters. The LNBs 218 and 220 receive as inputs the high frequency signal from the LNAs 214 and 216, respectively, and a lower frequency stabilized oscillator signal from a stabilized local oscillator (see below). The difference of the two signals is used as the IF signal.

Because the stabilized oscillator signal remains at, and does not drift from, the desired frequency (see below), the IF signal output from the LNBs 218 and 220 remains at a desired frequency. Whereas, in prior systems, a signal output from a block converter or a mixer drifted from a desired frequency because the input to the block converter or the mixer came from a local oscillator that was not stable and constant at a desired frequency.

The FOTs 222 or 224 receive the IF signal from the LNB 218 or 220, respectively, and convert the IF signal from an electrical IF signal to an optical signal. In addition, the FOTs 222 and 224 transmit the optical signal over a fiber optic cable. Preferably, the FOTs 222 and 224 transmit the optical signal as a 44 MHz optical IF signal over fiber optic cable.

The optical receiving system 210 receives the optical signal from the FOT 222s and 224. The optical system 210 may convert the optical signal to an electrical signal. Preferably, the optical receiving system 210 comprises a dual FOT receiver and selector (DFRS) 226.

The DFRS 226 determines if one or more optical signals are being transmitted from either the main signal converting system 206 or the redundant signal converting system 208 and selects the active signal for reception. Since one stream of optical signals typically will be actively transmitted from the FOT 222 or 224 at one time, the DFRS 226 determines if an active optical signal is being transmitted from one of the FOTs 222 or 224 and selects the active optical signal for reception. The DFRS 226 receives the optical signals at a fiber optic receiver. It is preferred to have unity gain between the FOTs 222 or 224 and the DFRS 226 such that the optical signal is received at the DFRS at the same level at which it was transmitted from the FOTs.

The DFRS 226 also can convert the optical signals to electrical signals. Preferably, the DFRS 226 converts the optical signals to 44 MHz electrical signals. However, the DFRS 226 can be configured to transmit optical signals without converting them.

It will be appreciated that other frequency signals may be received or used. Thus, the communication signal can be other than an MMDS signal and can be amplified to a greater or lesser extent than described above. In addition, the communication signal and the optical signal can be converted to a frequency higher or lower than that described above.

The stabilization system 212 stabilizes the local oscillator that provides an input to the LNBs 218 and 220, preferably with a stable timing signal, such as a GPS timing signal. The stabilization system 212 of FIG. 2 also provides power to the main and redundant converter systems 206 and 208. The stabilization system 212 comprises a timing source 230, a transformer 232, an inserter 234, a distributor 236, and a stabilized local oscillator 238. Optionally, the stabilization system 212 may include an external GPS receiver 240, a suppressor 242 at the base of the tower, and a suppressor 244 at the mid or upper portion of the tower.

The timing source 230 generates a stable timing signal, such as a GPS based timing signal. The GPS timing signal has a timing component that is very accurate. This timing component is based on timing from atomic clocks in the GPS satellites that are synchronized so that the timing can be used for precise measurements. It is this timing component that is used for the GPS timing signal. Preferably, the timing source 230 generates a 10 MHz GPS pulse. The timing source 230 may have a backup timing source if the primary timing source fails.

It will be appreciated that a stabile timing signal other than a GPS timing signal may be used so long as its accuracy is dependable. Also, a stabile timing source other than the timing source 230 may be used. In some embodiments, for example, the wireless communication system 102 can use a rubidium oscillator timing source or a long range aid to navigation (LORAN) timing source to generate a stable timing signal.

The transformer 232 transforms power received from a power source to a power level that can be transmitted up the tower. The transformer 232 can be configured to transform the received power as an alternating current (AC) and/or a direct current (DC).

Preferably, the transformer 232 transforms a 110 volt (V) source to a 24 V alternating current (AC) signal and transmits the 24 VAC signal to the inserter 234. The AC power helps reduce electrolysis that can occur on components of the wireless communication system 102A. Electrolysis occurs when connectors or pieces of equipment corrode due to oxidation. This electrolysis can occur with greater rapidity when a DC power source is used because ionic flow occurs in a single direction of the direct flow of current causing polarization of water molecules, thereby increasing oxidation. When AC power is used, electrolysis is lessened because there is no molecular disassociation in a single direction of current flow since the current alternates frequency. Alternately, it is preferred that the transformer 232 transforms a 110 V source to a 24 VDC signal and transmits the 24 VDC signal to the inserter 234.

The inserter 234 receives power from the transformer 232 and a stable timing signal from the timing source 230. The inserter 234 then transmits the power and the stable timing signal over a transmission medium 246 capable of carrying the power, such as a thin coax cable. In one embodiment, the inserter 234 receives 24 VDC power from the transformer 232 and a 10 MHz GPS pulse as the stable timing signal and transmits the power and the GPS timing signal over coax cable. In another embodiment, the inserter 234 receives 24 VAC power from the transformer 232 and a 10 MHz GPS pulse as the stable timing signal and transmits the power and the GPS timing signal over coax cable. Other transmission mediums may be used.

Alternately, the transmission medium 246 may be two or more different transmission lines. In this case, the inserter 234 can distribute power on one or more transmission lines and the stable timing signals on one or more other transmission lines. In addition, a combination of power and stable timing signals may be transmitted on one or more transmission lines.

The distributor 236 operates as a reverse inserter to remove power from the transmission medium 246 and to distribute the power to the LNAs 214 and 216, the LNBs 218 and 220, the FOTs 222 and 224, and the stabilized local oscillator 238. The distributor 236 also may be configured to distribute power to the filter 204.

The stabilized local oscillator 238 generates a stabilized oscillator signal as its output. The stabilized local oscillator 238 transmits the stabilized oscillator signal to the LNBs 218 and 220.

The stabilized oscillator signal is stabilized by a stable timing signal, such as a GPS timing signal, generated from the timing source 230. This GPS timing signal is received as an input into the stabilized local oscillator 238 and enables the stabilized local oscillator and its oscillations to be synchronized with a very accurate timing source, i.e. the timing source. Since the input to the stabilized local oscillator 238 is stable and accurate, the output of the stabilized local oscillator remains stable. The output of the stabilized local oscillator 238 essentially is phase locked by the GPS timing signal to a stable and accurate frequency. Thus, the output of the stabilized local oscillator 238 does not drift from, and remains at, the desired frequency. This is an advance over prior systems in which the frequency of the local oscillator drifted, thereby causing the output of the local oscillator to drift.

The external GPS receiver 240 receives timing signals from an external timing source and generates the timing signals to the timing source 230. The external GPS receiver 240 may include an antenna. The external GPS receiver 240 is optional and may not be needed if an external timing source is not used.

Preferably, the external GPS receiver 240 receives GPS signals from satellites or another GPS source and generates the GPS timing signal to the timing source 230. The external GPS receiver 240 may include an antenna. The external GPS receiver 240 is optional, and another GPS timing signal generator may be used. Alternately, if a stable timing source other than a GPS timing source is used, the external GPS receiver can be replaced with that stable timing source or excluded.

The suppressors 242 and 244 suppress electrical interference created by lightning and other sources. This reduces the possibility of components at the mid and upper portions of a tower and the base of the tower from being damaged from lightning and other electrical interference. The suppressors 242 and 244 are optional.

The antenna 202, the filter 204, the LNAs 214 and 216, the LNBs 218 and 220, the FOTs 222 and 224, the stabilized local oscillator 238, and the distributor 236 typically are at the upper portion 248 of a tower. The DFRS 226, the timing source 230, the transformer 232, the inserter 234, and the external GPS receiver 240 typically are at the base 250 of the tower. The fiber optic cables from the FOTs 222 and 224 may be the fiber optic cables 252 and 254 or other optical fibers.

The wireless communication system 102A of FIG. 2 operates as follows. In a first example, the transformer 232 transforms a 110 V power source to a 24 VAC power source and transmits the 24 VAC power to the inserter 234.

In addition, the external GPS receiver 240 receives GPS signals from a GPS source. The external GPS receiver 240 transmits the GPS signals as GPS timing signals to the timing source 230.

The timing source 230 generates a stable GPS timing signal to the inserter 234. If the external GPS receiver 240 fails and is unable to transmit the GPS timing signals to the timing source 230, the timing source will generate to the inserter 234 a stable timing signal based upon prior received GPS timing signals or another stable timing source, such as a rubidium oscillator timing source.

The inserter 234 receives the GPS timing signal from the timing source 230 and receives the 24 VAC power from the transformer 232. The inserter 234 transmits the GPS timing signal and the 24 VAC power on a transmission medium 246 capable of handling the GPS timing signal and the 24 VAC power.

In this example, the inserter 234 transmits the GPS timing signal as a 10 MHz timing pulse and the 24 VAC power source over the transmission medium 246. In this example, the transmission medium 246 is a coax cable.

The distributor 236 pulls the 24 VAC power from the transmission medium 246 and distributes the 24 VAC power to the LNA 214, the LNB 218, the FOT 222, and the stabilized local oscillator 238. In addition, the distributor 236 can distribute the 24 VAC power to the filter 204. It will be appreciated that, although the redundant signal converting system 208 is not used in this example, the distributor 236 also can be configured to distribute the 24 VAC power to the LNA 216, the LNB 220, and the FOT 224.

The stabilized local oscillator 238 receives the GPS timing signal. The GPS timing signal is used as an input timing pulse into the stabilized local oscillator 238 to generate as an output to the LNB 218 a stabilized oscillator signal having a stable frequency. It will be appreciated that in other examples, the stabilized local oscillator 238 also generates the stabilized oscillator signal to the LNB 220.

The antenna 202 receives a communication signal. The filter 204 receives the communication signal from the antenna 202 and blocks any emissions or other communication signals outside of the frequency desired for the communication signal. In this example, the main signal converting system 206 is able to process the wireless communication. Therefore, the filter 204 transmits the communication signal to the LNA 214 for the main signal converting system 206.

The LNA 214 receives the communication signal from the filter 204 and amplifies the communication signal. The LNA transmits the communication signal to the LNB 218.

The LNB 218 receives the communication signal from the LNA 214 and receives the stabilized oscillator signal from the stabilized local oscillator 238. The LNB 218 mixes the communication signal with the stabilized oscillator signal and generates the difference between the communication signal and the stabilized oscillator signal as an IF signal. The LNB 218 transmits the IF signal to the FOT at approximately a 44 MHz center frequency.

The FOT 222 receives the IF signal from the LNB 218 and converts the IF signal to an optical signal. In this example, the FOT 222 transmits the optical signal as a 44 MHz optical IF signal over fiber optic cable from the upper portion 248 of the tower to the DFRS 226 at the base 250 of the tower. It will be appreciated that the DFRS 226 may be located within a distance of the actual base 250 of the tower and not at the actual base of the tower. In this example, the DFRS 226 is located 50 meters from the actual base 250 of the tower. In other examples, the DFRS 226 may be located at the actual base 250 of the tower or at a greater or lesser distance from the actual base of the tower.

The DFRS 226 determines whether an optical signal is being received over the fiber optic cable 252 of the main signal converting system 206 or the fiber optic cable 252 of the redundant signal converting system 208. The DFRS 226 determines that an active optical signal is being transmitted over the fiber optic cable 252 from the FOT 222 of the main signal converting system 206. The DFRS 226 receives the optical signal over the fiber optic cable 252 from the FOT 222.

The DFRS 226 also converts the optical signal to an electrical signal. In this example, the DFRS 226 converts the optical signal to an electrical 44 MHz IF signal. The DFRS 226 then transmits the electrical signal to another component of the wireless communication system 102A.

In a second example, the antenna 202 receives a communication signal along with other emissions and communications outside of the frequency of the desired frequency of the signal. The antenna 202 transmits the communication signal, the emissions, and the other communications to the filter 204.

The filter 204 receives the communication signal, the emissions, and the other communications from the antenna 202. The filter 204 filters out the emissions and the other communications so that only the desired communication signal remains. The filter 204 determines whether to transmit the communication signal to the LNA 214 of the main signal converting system 206 or the LNA 216 of the redundant signal converting system 208.

In this example, the communication signal is transmitted from the filter 204 to the LNA 216 of the redundant signal converting system 208. In this example, the main signal converting system 206 is not working.

The LNA 216 receives the communication signal from the filter 204. The LNA 216 amplifies the communication signal and transmits the communication signal to the LNB 220.

While the antenna 202 is receiving the signal, the stable timing signal and the power are being transmitted from the base 250 of the tower to the upper portion 248 of the tower. In this example, the external GPS receiver 240 is not present.

The timing source 230 generates a stable timing signal to the inserter 234. In addition, the transformer 232 generates power to the inserter 234. The inserter 234 receives the stable timing signal from the timing source 230, receives the power from the transformer 232, and transmits the stable timing signal and the power over the transmission medium 246. In this example, the transmission medium comprises two cables. One of the cables carries the stable timing signal, and the other cable carries the power. In this example, suppressors 242 and 244 are located at the base 250 of the tower and the upper portion 248 of the tower, respectively.

The distributor 236 receives the power over the transmission medium 246. The distributor 236 distributes the power to the LNAs 214 and 216, the LNBs 218 and 220, the FOTs 222 and 224, and the stabilized local oscillator 238. It also may supply power to the filter 204. However, the filter 204 may be passive.

The stabilized local oscillator 238 receives the stable timing signal from the transmission medium 246. The timing pulses from the stable timing signal are used as inputs to the stabilized local oscillator 238 to generate as its output a stable oscillator signal having a consistent, accurate, and desired frequency. The stable oscillator signal is delivered to the LNBs 218 and 220. It will be appreciated that, in this example, the power and the stabilized oscillator signal are distributed to both the main signal converting system 206 and the redundant signal converting system 208.

The LNB 220 receives the communication signal from the LNA 216 and receives the stabilized oscillator signal from the stabilized local oscillator 238. The LNB 220 mixes the communication signal and the stabilized oscillator signal and generates the difference of the communication signal and the stabilized oscillator signal as a lower frequency IF signal to the FOT 224.

The FOT 224 receives the IF signal from the LNB 220 and converts the IF signal to an optical signal. The FOT transmits the optical signal over fiber optic cable 254 to the DFRS 226.

The DFRS 226 polls the fiber optic cables 252 and 254 from the main signal system 206 and the redundant signal converting system 208. The DFRS 226 determines that an optical signal is being transmitted over the fiber optic cable 254 from the FOT 224 of the redundant signal converting system 208.

The DFRS 226 receives the optical signal over the fiber optic cable 254 from the FOT 224 and converts the optical signal to an electrical signal. The DFRS 226 transmits the electrical signal to another system or to another component of the wireless communication system 102A.

In another example, the timing source 230, the external GPS receiver 240, and the redundant signal converting system 208 are not present. In this example, the inserter 234 transmits power over the transmission medium 246. The distributor 236 receives the power and distributes the power to the LNA 214, the LNB 218, and the FOT 222. In this example, the stabilized local oscillator 238 resides within the LNB 218.

A communication signal is received by the antenna 202 and transmitted to the filter 204. The filter 204 filters the communication signal and transmits the communication signal to the LNA 214.

The LNA 214 amplifies the communication signal and transmits the communication signal to the LNB 218. The LNB 218 converts the communication signal from a higher frequency to a lower frequency IF signal and transmits the IF signal to the FOT 222.

The FOT 222 receives the IF signal from the LNB 218 and converts the IF signal to an optical signal. The FOT 222 transmits the optical signal over a fiber optic cable 252 to the DFRS 226.

The DFRS 226 receives the optical signal over the fiber optic cable 252. The DFRS 226 transmits the optical signal to another component in the wireless communication system 102A or to another system.

Figure 3:
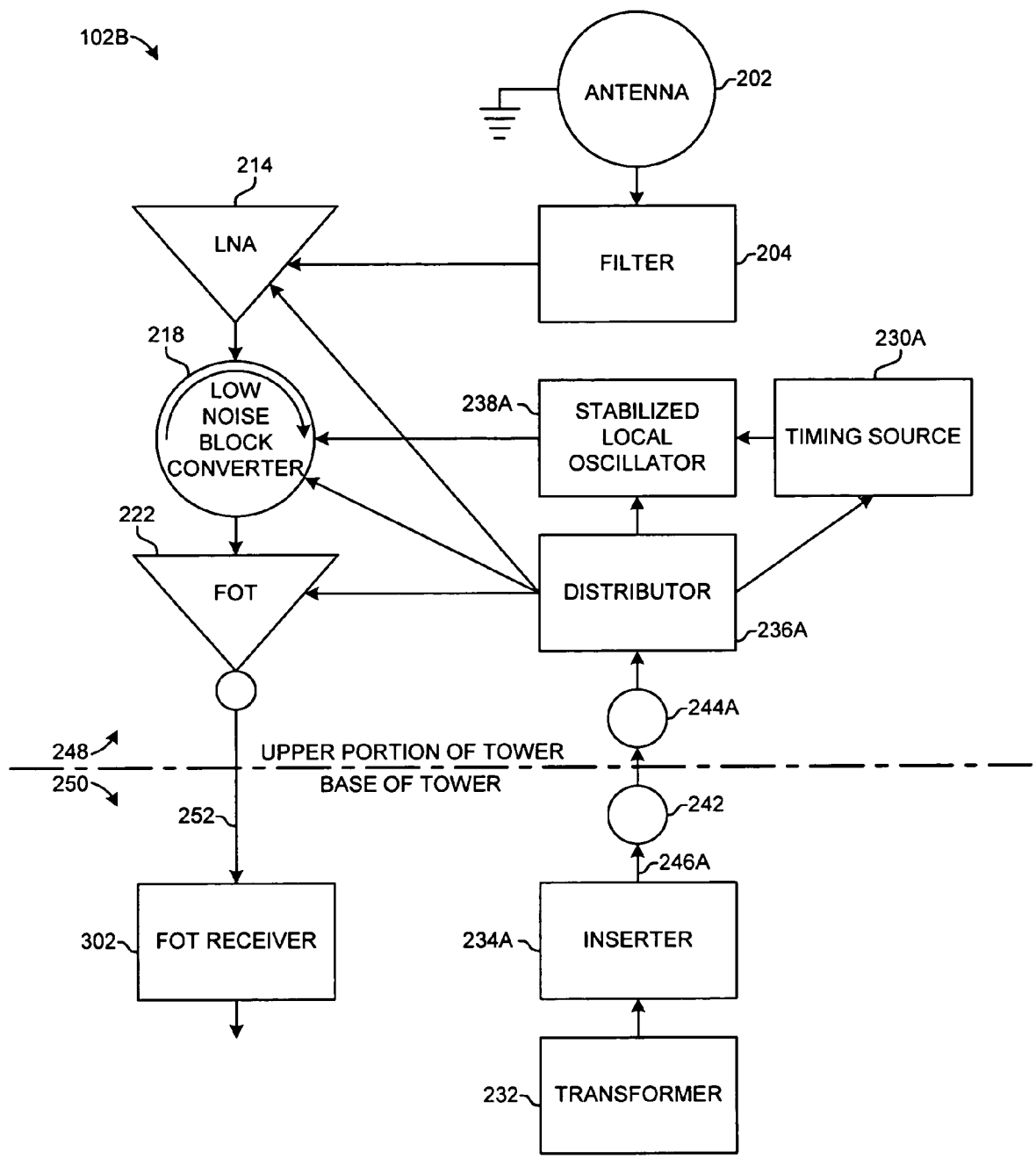
FIG. 3 is a block diagram of another wireless communication system in accordance with an embodiment of the present invention.

FIG. 3 illustrates an exemplary embodiment of an alternative wireless communication system. The wireless communication system 102B of FIG. 3 comprises the antenna 202, the filter 204, the LNA 214, the LNB 218, the FOT 222, the transformer 232, the distributor 236, the stabilized local oscillator 238, the suppressors 242 and 244, and the transmission medium 246 of FIG. 2. The wireless communication system 102B also comprises a timing source 230A, an inserter 234A, and a FOT receiver 302. The components of the wireless communication system 102B operate the same as the components of the wireless communication system 102A of FIG. 2 except for the following.

The stabilized local oscillator 238A operates the same as the above described stabilized local oscillator 238 of FIG. 2. It will be appreciated that the stabilized local oscillator 238A may be internal or external to the LNB 218. If the stabilized local oscillator 238A is internal to the LNB 218, the distributor 236 need not separately distribute power to the stabilized local oscillator.

The timing source 230A is mounted at the upper portion 248 of the tower. The timing source 230A transmits the stable timing signal to the stabilized local oscillator 238A.

The timing source 230A generates a stable timing signal, such as the GPS based timing signal described above. If the timing source 230A is to generate a GPS timing signal, then the timing source will be equipped with an external receiver, such as the external GPS receiver 240 of FIG. 2, that is configured to receive GPS signals from satellites or from another GPS source. In this instance, the timing source 230A generates an accurate GPS timing signal, preferably a 10 MHz, GPS referenced pulse. Alternately, the timing source 230A can be configured to generate a stable timing signal other than a GPS timing signal. Examples of timing sources that may generate a stable timing signal include a LORAN timing source and a rubidium oscillator timing source.

The inserter 234A receives power from the transformer 232 and transmits the power over the transmission medium 246. The inserter 234A may transmit any appropriate power level over the transmission medium 246, such as 24 VAC power or 24 VDC power. Other power levels may be used.

The FOT receiver 302 receives optical signals from the FOT 222 via the fiber optic cable 252. The FOT 302 also can be configured convert the optical signals to electrical signals. However, the FOT receiver 302 can be configured to transmit optical signals without converting them.

The wireless communication system 102B of FIG. 3 operates as follows. In a first example, the transformer 232 transforms an input power source to 24 VDC power and transmits the 24 VDC power to the inserter 234A. The inserter 234A transmits the 24 VDC power over the transmission medium 246. In this example, the transmission medium 246 is thin coax. The distributor 236 receives the power over the transmission medium 246 and distributes the power to the LNA 214, the LNB 218, the FOT 222, and the stabilized local oscillator 238A. It will be appreciated that other methods and components may be used to distribute the power to the components at the upper portion 248 of the tower.

The timing source 230A receives GPS signals and generates a GPS timing signal to the stabilized local oscillator 238A. In this example, the timing source 230A generates a 10 MHz timing pulse to the stabilized local oscillator 238A. One or more timing pulses may be generated as the stable timing signal.

The stabilized local oscillator 238A receives the stable timing signal as an input and uses the stable timing signal to generate a stable oscillator signal with a stable frequency as an output. This output frequency does not drift from, and remains at, a desired frequency. The stabilized local oscillator 238A transmits the stabilized oscillator signal to the LNB 218.

Concurrently, a communication signal is received at the antenna 202. The antenna 202 transmits the communication signal to the filter 204. The filter 204 filters the communication signal and transmits the communication signal to the LNA 214.

The LNA 214 amplifies the communication signal and transmits the communication signal to the LNB 218. The LNB 218 receives the communication signal from the LNA 214 and receives the stabilized oscillator signal from the stabilized local oscillator 238A. The LNB 218 mixes the communication signal with the stabilized oscillator signal to generate a lower frequency IF signal as its output. The LNB 218 transmits this IF signal to the FOT 222.

The FOT 222 receives the IF signal from the LNB 218 and converts the IF signal to an optical signal. The FOT 222 then transmits the optical signal over the fiber optic cable 252.

The FOT receiver 302 receives the optical signal over the fiber optic cable 252 and converts the optical signal to an electrical signal. The FOT receiver 302 then can transmit the electrical signal to another component of the wireless communication system 102B or to another system.

In another example, the transformer 232 transforms an input power source to 24 VAC power and transmits the 24 VAC power to the inserter 234A. The inserter transmits the 24 VAC power over the transmission medium 246. In this example, the transmission medium 246 is thin coax. The distributor 236 receives the power over the transmission medium 246 and distributes the power to the LNA 214, the LNB 218, the FOT 222, the timing source 230A, and the stabilized local oscillator 238A. It will be appreciated that other methods and components may be used to distribute the power to the components at the upper portion 248 of the tower.

The timing source 230A generates a stable timing signal to the stabilized local oscillator 238A. In this example, the timing source 230A does not generate a GPS timing signal to the stabilized local oscillator 238A.

The stabilized local oscillator 238A receives the stable timing signal and generates a stabilized oscillator signal as an output. The stabilized local oscillator 238A transmits the stabilized oscillator signal to the LNB 218.

Concurrently, a communication signal is received at the antenna 202. The antenna 202 transmits the communication signal to the filter 204. The filter 204 filters the communication signal and transmits the communication signal to the LNA 214.

The LNA 214 amplifies the communication signal and transmits the communication signal to the LNB 218. The LNB 218 receives the communication signal from the LNA 214 and receives the stabilized oscillator signal from the stabilized local oscillator 238A. The LNB 218 mixes the communication signal with the stabilized oscillator signal to generate an IF signal as its output. The LNB 218 transmits this IF signal to the FOT 222.

The FOT 222 receives the IF signal from the LNB 218 and converts the IF signal to an optical signal. The FOT 222 then transmits the optical signal over the fiber optic cable 252.

The FOT receiver 302 receives the optical signal over the fiber optic cable 252. The FOT receiver 302 transmits the optical signal to another component of the wireless communication system 102B or to another system.

Those skilled in the art will appreciate that variations from the specific embodiments disclosed above are contemplated by the invention. The invention should not be restricted to the above embodiments, but should be measured by the following claims.

What is claimed is:

1. A system for receiving a communication signal at a tower having an upper portion and a lower portion, the system comprising:

a timing source located at the lower portion and configured to generate a stable timing signal, wherein the stable timing signal comprises a global positioning system based timing signal;

a transmission medium extending between the upper portion and the lower portion and configured to carry power and the stable timing signal from the lower portion to the upper portion;

an inserter located at the lower portion and configured to insert the power and the stable timing signal onto the transmission medium;

a stabilized local oscillator located at the upper portion and configured to receive the stable timing signal and to use the stable timing signal as an input to generate a stabilized oscillator signal comprising a frequency that does not drift;

an antenna located at the upper portion and configured to receive the communication signal;

a block converter configured to use the stabilized oscillator signal to convert a frequency of the communication signal to a stable lower frequency;

a fiber optic transmitter located at the upper portion and configured to convert the lower frequency communication signal to an optical signal and to transmit the optical signal over fiber optic cable extending between the upper portion and the lower portion;

a fiber optic receiver located at the lower portion and configured to receive the optical signal over the fiber optic cable;

a redundant block converter located at the upper portion and configured to use the stabilized oscillator signal to convert the frequency of the communication signal to another stable lower frequency;

a redundant fiber optic transmitter located at the upper portion and configured to convert the other lower frequency communication signal to another optical signal and to transmit the other optical signal over another fiber optic cable extending between the upper portion and the lower portion;

a redundant fiber optic receiver located at the lower portion and configured to receive the other optical signal over the other fiber optic cable;

a filter coupled to the antenna and configured to filter at least one member of a group consisting of emissions and another communication signal from the communication signal, the filter being further configured to transmit the communication signal to either the block converter or the redundant block converter; and a selector located at the lower portion and configured to select for receiving either the optical signal or the other optical signal.

2. The system of claim 1 further comprising an amplifier configured to amplify the communication signal.

3. The system of claim 1 further comprising an electrical converter located at the lower portion and configured to convert the optical signal to an electrical signal.

4. The system of claim 1 further comprising a transformer located at the lower portion and configured to transform the power from a first level to a second level, wherein the inserter is configured to receive the power at the second level.

5. The system of claim 1 further comprising a distributor located at the upper portion and configured to receive the power over the transmission medium and to distribute the power to at least one member of a group consisting of the block converter, the fiber optic transmitter, and the stabilized local oscillator.

6. The system of claim 1 further comprising an external receiver located at the lower portion and configured to receive external timing signals from an external timing source and to generate the external timing signals to the timing source.

7. The system of claim 1 further comprising a suppressor configured to suppress electrical interference for the system.

8. The system of claim 1 wherein the stable timing signal comprises approximately a ten megahertz global position system timing pulse.

9. The system of claim 1 wherein the communication signal comprises a multipoint multichannel distribution service based communication signal.

10. The system of claim 1 wherein the frequency of the communication signal comprises a high frequency and the stable lower frequency comprises an intermediate frequency.

11. The system of claim 1 wherein the frequency of the communication signal comprises approximately between 2.15-2.17 gigahertz.

12. A method for receiving a communication signal at a tower having an upper portion and a lower portion, the method comprising:
   generating a stable timing signal at the lower portion, wherein the stable timing signal comprises a global positioning system based timing signal;
   inserting power and the stable timing signal at the lower portion onto a transmission medium extending between the lower portion and the upper portion;
   using the stable timing signal as an input to a local oscillator located at the upper portion to generate a stabilized oscillator signal comprising a frequency that does not drift;
   receiving the communication signal at the upper portion;
   filtering at least one member of a group consisting of emissions and another communication signal from the communication signal;
   transmitting the communication signal to either a block converter or a redundant block converter at the upper portion;
   if the communication signal is received at the block converter:
      using the stabilized oscillator signal to convert a receiving frequency of the communication signal at the block converter to a stable lower frequency at the upper portion;
      converting the lower frequency signal to an optical signal at the upper portion and transmitting the optical signal over fiber optic cable extending between the upper portion and the lower portion; and
      receiving the optical signal over the fiber optic cable at the lower portion;
   if the communication signal is received at the redundant block converter:
      using the stabilized oscillator signal to convert a receiving frequency of the communication signal at the redundant block converter to another stable lower frequency at the upper portion;
      converting the other lower frequency signal to another optical signal at the upper portion and transmitting the other optical signal over another fiber optic cable extending between the upper portion and the lower portion; and
      receiving the other optical signal over the other fiber optic cable at the lower portion; and
   selecting for receiving either the optical signal or the other optical signal.

13. The method of claim 12 further comprising amplifying the communication signal.

14. The method of claim 12 further comprising converting the optical signal to an electrical signal after receiving the optical signal over the fiber optic cable at the lower portion.

15. The method of claim 12 further comprising receiving external timing signals at the lower portion from an external timing source and using the external timing signals to generate the stable timing signal.

16. The method of claim 12 wherein the communication signal comprises a multipoint multichannel distribution service based communication signal.

17. The method of claim 12 wherein the receiving frequency of the signal comprises a high frequency and the lower frequency comprises an intermediate frequency.

* * * * *